March 4, 1930.  H. T. BLAKE  1,748,943
MACHINE FOR CLEANING BEANS, PEAS, ETC
Filed Sept. 29, 1928
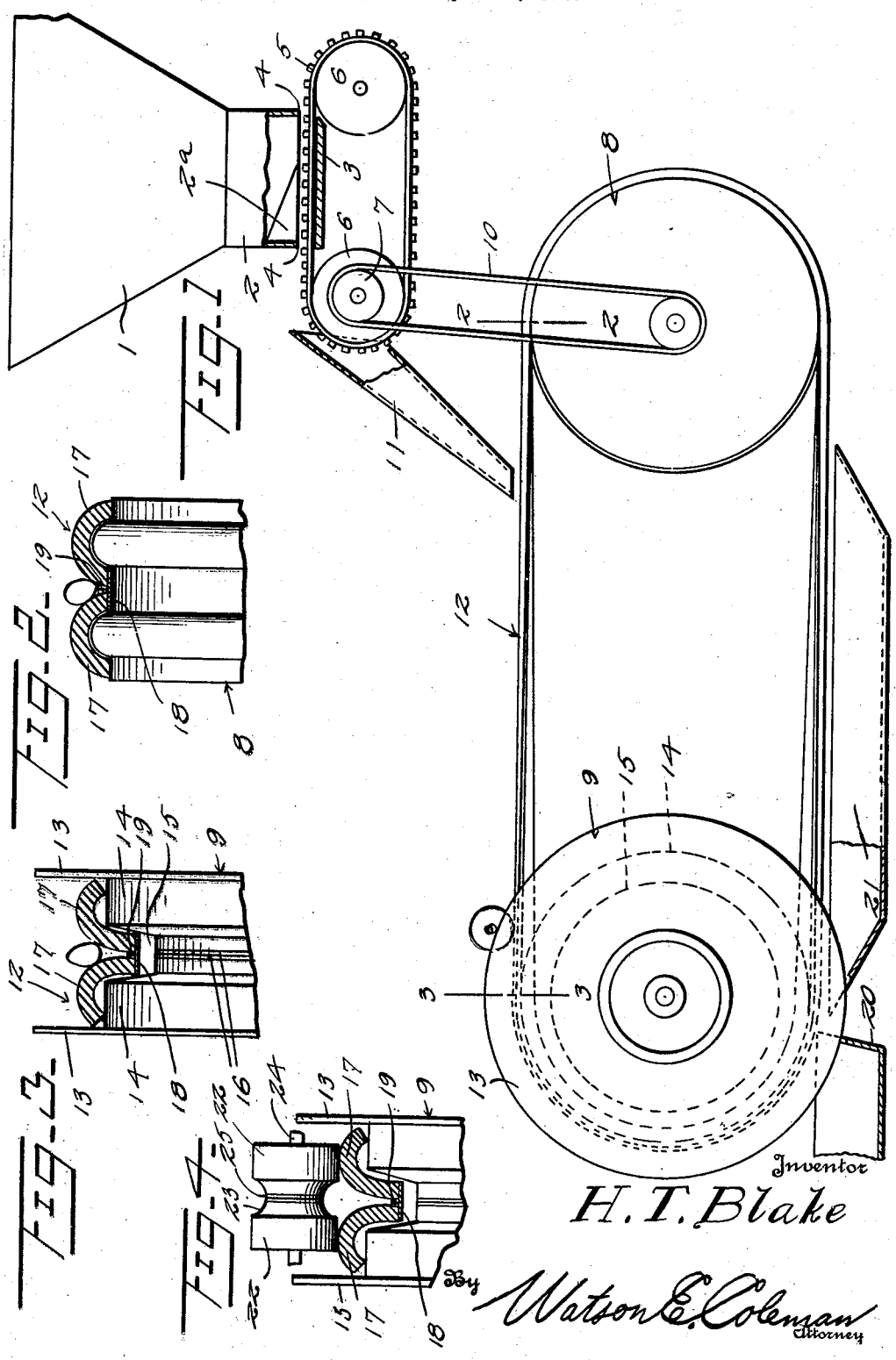
Inventor
H. T. Blake
By Watson E. Coleman
Attorney Patented Mar. 4, 1930

1,748,943

UNITED STATES PATENT OFFICE

HERBERT T. BLAKE, OF BURLEY, IDAHO

MACHINE FOR CLEANING BEANS, PEAS, ETC.

Application filed September 29, 1928. Serial No. 309,313.

This invention relates to a mechanical picker or sorter for beans, peas and the like, having for it primary object to provide a machine which will effectively remove from a quantity of peas or beans, all immature, split, broken or otherwise damaged ones and also any foreign matter which may be present.

At the present time a large percentage of beans produced for the market are hand picked to remove those which are damaged or to free the same from foreign matter, not taken out by the cleaning machines through which the beans may have been previously passed. Different types of cleaning machines are employed, some using blowers and screens, others employing rubber rolls and while the rubber roll type of machine is fairly satisfactory for round beans such as those of the pea bean type, it has not been found satisfactory for use in cleaning long beans of the character of Great Northerns, kidneys, Limas, etc.

The present machine is designed to thoroughly clean all types of beans whether of the round or elongated type, by picking out and holding the damaged and broken ones or particles of foreign matter which may be mixed therewith while delivering good beans to a receiver.

The invention broadly contemplates the provision of a carrier belt on to which the beans are dumped formed of two endless strips of resilient material secured together along one edge, the free edges of the material normally falling apart, thus forming a gutter-like receiver for the beans.

Operating in conjunction with the belt is an especially constructed pulley having the periphery thereof so grooved that as the belt passes thereover the free edges thereof will be moved upwardly and together, thus frictionally engaging between the strips of broken beans or irregular pieces of foreign material, the smooth whole beans being supported upon the adjacent surfaces of the strips but not gripped thereby. These whole beans are dumped from the belt as the same moves down over the pulley into a receptacle while the broken beans and foreign matter are held until the belt passes the lowermost portion of the pulley after which they are dropped into a suitable receiver.

The invention will be best understood from a consideration of the following detailed description taken in connection with the accompanying drawings forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of the separator blade structure and supporting pulleys, embodying the present invention, means being shown associated therewith for depositing beans upon the separator;

Figure 2 is a sectional view through the separator blade on the line 2—2 of Figure 1, the associate supporting pulley being shown in elevation;

Figure 3 is a sectional view through the blade taken on the line 3—3 of Figure 1, the pulley structure employed for closing the blade sections being shown in elevation.

Figure 4 is a view similar to Figure 3 taken at a point adjacent the belt straddling pulley, showing the position of the same thereon.

Referring to the drawing, the numeral 1 indicates a hopper of any desired type into which the beans to be cleansed may be dumped, the lower portion of the hopper having the usual downwardly opening outlet nozzle 2. The nozzle 2 has a bottom wall 3 therein and has opposite points of the side wall provided with openings 4 through which a carrier belt 5 is designed to pass, this belt being of the endless type and passing over the spaced driven pulleys or cylinders 6, one of which is provided at one end with a small pulley 7.

The lower portion of the nozzle 2 has positioned therein at one side thereof the tapered wedge-shaped block $2^a$ which acts to separate the beans as they pass downwardly to the conveyor to prevent crowding.

Arranged a plane lower than the hopper belt or conveyor 5 is a structure embodying the principal feature of the present invention. This structure comprises a pair of spaced pulleys 8 and 9, the pulleys 8 being preferably located beneath the cylinder carrying the driving pulley 7, so that a suitable driving belt connection 10 may be made between the endless conveyor 5 and the pulley carrying the bean picker or cleaner belt.

A suitable chute 11 is provided to receive the beans from the conveyor 5 and deposit them upon the cleaner belt 12 which passes over and connects the pulleys 8 and 9 in the manner shown.

While the pulley 8 may be of any suitable construction for carrying the belt 12, the pulley 9 is of special design and is constructed to co-operate with the belt 12 to perform the picking or cleaning operation.

The pulley 9 comprises two disk-like halves, each of which includes an outer plate 13 and a reduced body 14 of less diameter than the plate and secured concentrically upon one face thereof. These reduced bodies or portions 14 of the pulley halves are brought into face opposed relation in the manner shown, thus providing the pulley with the surrounding central substantially U-shaped groove 15. The portions 14 of the pulley halves may be directly abutting or for purposes hereinafter described, they may have interposed therebetween a number of metal washers 16 which act as will be readily seen to increase the width of the pulley and the groove 15.

The endless picker belt 12 is made up of a pair of strips 17 of resilient material, these strips being secured together along one edge as indicated at 18, thus making the belt structure assume a substantially V-shaped cross-sectional design.

The strips 17 making up the picker belt may be secured directly together along their adjacent edges or there may be interposed between these adjacent edges one or more thicknesses of a suitable fabric as indicated at 19, to accommodate the belt to the size of bean which it is to handle.

The width and depth of the groove 15 in the pulley 9 is such that the portion of the picker belt lying therein or passing thereinto will be closed up, that is, the strips 17 of which the belt is made up, will be caused to change from the spread apart condition in which they pass under the chute 11 to a closed up position. It will thus be readily understood that beans both whole and broken and any foreign matter which may be mixed therewith will be deposited from the chute 1 on to the picker belt while the strips thereof are lying spread apart.

As the portion of the belt supporting the beans enters the groove 15 in the closing up pulley 9 the strips will be brought together, thus frictionally gripping therebetween all broken, uneven or otherwise undesirable beans while the smooth whole beans will be squeezed upwardly to ride on top of the adjacent faces of the strips.

A receiving receptacle 20 for the selected beans is located directly beneath the belt closing pulley 9 so that as the belt passes over this pulley the beans will roll therefrom into this receiving hopper. Another receptacle 21 may be positioned beneath the belt so as to receive broken beans or foreign matter held between the strips 17 as soon as the same open to their normal condition after leaving the pulley.

From the foregoing description, it will be readily seen that the present bean picker may be advantageously used for either round or elongated beans and that broken beans can be removed without damage to the good ones.

In order to start the carrier bent properly as it passes over the pulley 9, to prevent the belt from crawling up on the side of the grooved pulley as it has a tendency to do, there is mounted in any suitable manner over the pulley a two-part roller 22, this roller being centrally transversely divided as shown and having a circumferential groove 23 formed about the center thereof, one half of the groove being formed in each of the two sections of which the pulley is made up. This pulley is suitably supported upon a shaft 24 to straddle the carrier belt 12, the groove 23 directly overlying the longitudinal center of the belt as shown in Figure 4.

The groove 23 of the belt holding pulley 22 permits beans to pass without being damaged while the pulley holds the sides of the carrier belt down to compel it to pass on to the pulley 9 in the proper manner. In order to accommodate the pulley 22, to carrier belts of different sizes, the same may be provided with one or more spacing washers 25 carried upon the shaft 24 and arranged between the sections of the pulley.

In the construction of the picker belt it is desirable that soft resilient material such as rubber be employed and it is noted, therefore, that strips of tubing or the like may be used for this purpose such as tubing of inner tires. It will also be seen that both the belt and pulley may be readily adjusted to receive beans of various sizes or different types of beans where the sizes vary, by increasing or decreasing the number of metal washers between the portions 14 and the roller 9 and by using a greater or lesser number of thicknesses of fabric between the strips 17.

Having thus described my invention, what I claim is:—

1. A bean picker of the character described, comprising a travelling belt designed to receive beans thereon, and means for bringing together portions of the belt adjacent the edges thereof for frictionally gripping undesirable beans or matter.

2. A bean picker of the character described, comprising a moving belt designed to have beans discharged thereon, means for folding the belt longitudinally to frictionally engage between the folded portions broken or undesirable beans, and means for receiving selected beans dumped from the belt before the same is unfolded to discharge the culls.

3. A bean picker, comprising a moving belt of normally substantially V-shaped cross-sectional design designed to have beans discharged thereon, a pulley supporting the belt and formed to bring the sides of the same into closer relation as it passes thereover to frictionally engage undesirable beans, selected beans being squeezed upwardly to ride upon the top of the belt, and means for receiving the selected beans from the belt as it passes over the pulley before the belt leaves the pulley and opens to discharge the culls.

4. A bean picker, comprising a moving belt of normally substantially V-shaped cross-sectional design designed to have beans discharged thereon, a pulley supporting the belt and formed to bring the sides of the same into closer relation as it passes thereover to frictionally engage undesirable beans, selected beans being squeezed upwardly to ride upon the top of the belt, means for receiving the selected beans from the belt as it passes over the pulley before the belt leaves the pulley and opens to discharge the culls, and means for adjusting the belt and pulley to receive types of beans varying in size.

5. A bean picker, comprising an endless belt formed of a pair of strips secured together along one edge to form a belt of substantially V-shaped cross-sectional design, supporting pulleys for the belt, one thereof having a grooved peripheral surface designed to bring said strips into closer side by side relation as the belt passes thereover to frictionally engage undesirable beans between the strips, and means adjacent the pulley for receiving selected beans riding upon the surface of the belt before the belt is opened to discharge the culls.

6. A bean picker, comprising an endless belt formed of a pair of strips secured together along one edge to form a belt of substantially V-shaped cross-sectional design, supporting pulleys for the belt, one thereof having a grooved peripheral surface designed to bring said strips into closer side by side relation as the belt passes thereover to frictionally engage undesirable beans between the strips, means adjacent the pulley for receiving selected beans riding upon the surface of the belt before the belt is opened to discharge the culls, and means for altering the width of the belt and grooved pulley to accommodate various types of beans.

7. A bean picker, comprising an endless belt formed of a pair of strips secured together along one edge to form a belt of substantially V-shaped cross-sectional design, supporting pulleys for the belt, one thereof having a grooved peripheral surface designed to bring said strips into closer side by side relation as the belt passes thereover to frictionally engage undesirable beans between the strips, means adjacent the pulley for receiving selected beans riding upon the surface of the belt before the belt is opened to discharge the culls, and spacing strips interposed between the strips of the belt to accommodate the same to beans of various sizes.

8. A bean picker, comprising an endless belt formed of a pair of strips secured together along one edge to form a belt of substantially V-shaped cross-sectional design, supporting pulleys for the belt, one thereof having a grooved peripheral surface designed to bring said strips into closer side by side relation as the belt passes thereover to frictionally engage undesirable beans between the strips, means adjacent the pulley for receiving selected beans riding upon the surface of the belt before the belt is opened to discharge the culls, spacing strips interposed between the strips of the belt to accommodate beans of various sizes, said pulley being formed in two complementary halves, and spacing washers designed to be interposed between the halves of the pulley to adjust the same to receive the belt.

9. A bean picker, comprising a moving belt of normally substantially V-shaped cross-sectional design designed to have beans discharged thereon, a pulley supporting the belt and formed to bring the sides of the same into closer relation as it passes thereover to frictionally engage undesirable beans, selected beans being squeezed upwardly to ride upon the top of the belt, means for receiving the selected beans from the belt as it passes over the pulley before the belt leaves the pulley and opens to discharge the culls, and roller means over said pulley to guide said belt to proper position thereon.

10. A separator for removing undesirable from desirable bodies, comprising an endless flexible travelling element adapted to have both types of bodies placed thereon, and means for bringing together portions of said element adjacent the edges thereof whereby the undesirable bodies will be held thereby after desirable bodies have been discharged therefrom.

In testimony whereof I hereunto affix my signature.

HERBERT T. BLAKE.